US010825026B2

(12) United States Patent
Gupta et al.

(10) Patent No.: US 10,825,026 B2
(45) Date of Patent: Nov. 3, 2020

(54) PAYMENT CARD TRANSACTION AUTHORIZATION SYSTEM AND PROCESS

(71) Applicant: MASTERCARD INTERNATIONAL INCORPORATED, Purchase, NY (US)

(72) Inventors: Ashutosh Kumar Gupta, Benares (IN); Dinesh Kumar Lal, Gurgaon (IN); Anshul Pandey, Gurgaon (IN); Teja Chebrole, Ahmedabad (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 77 days.

(21) Appl. No.: 16/112,645

(22) Filed: Aug. 25, 2018

(65) Prior Publication Data

US 2019/0066113 A1    Feb. 28, 2019

(30) Foreign Application Priority Data

Aug. 30, 2017    (SG) ............................. 10201707092S

(51) Int. Cl.
*G06Q 20/34* (2012.01)
*G06Q 20/40* (2012.01)
(Continued)

(52) U.S. Cl.
CPC ....... *G06Q 20/4093* (2013.01); *G06Q 20/204* (2013.01); *G06Q 20/206* (2013.01);
(Continued)

(58) Field of Classification Search
CPC .............. G06Q 20/20; G06Q 30/0601; G06Q 30/0267; G06Q 20/3276; G06Q 20/401; G06Q 20/204; G06Q 20/3674; G06Q 20/40; G06Q 20/4014; G06Q 20/3227; G06Q 20/351; G06Q 20/341; G06Q 20/327; G06Q 20/206; G06F 3/014; G06F 3/0321
(Continued)

(56) References Cited

U.S. PATENT DOCUMENTS 8,915,422 B1 * 12/2014 Harty .................... G06F 3/0416
                                                    235/375
9,092,690 B2 * 7/2015 Rowley ................ G06K 9/6267
(Continued)

FOREIGN PATENT DOCUMENTS

WO      2014165081 A1    10/2014

OTHER PUBLICATIONS

M. Dutta, K. K. Psyche, T. Khatun, M. A. Islam and M. A. Islam, "ATM Card Security Using Bio-Metric and Message Authentication Technology," 2018 IEEE International Conference on Computer and Communication Engineering Technology (CCET), Beijing, 2018, pp. 280-285, doi: 10.1109/CCET.2018.8542227. (Year: 2018).*

*Primary Examiner* — Bruce I Ebersman
*Assistant Examiner* — Steven R Chism

(57) ABSTRACT

Embodiments of the present invention can simplify the use of payment cards by capturing or generating an electronic image of a customer's payment card at the time of requesting a payment card transaction, and processing the electronic image to automatically determine required payment card information, including the payment card number, account name, and expiry date printed or otherwise represented on the payment card.

20 Claims, 8 Drawing Sheets

(51) Int. Cl.
*G06Q 20/20* (2012.01)
*G06Q 20/32* (2012.01)

(52) U.S. Cl.
CPC ....... *G06Q 20/3276* (2013.01); *G06Q 20/341* (2013.01); *G06Q 20/351* (2013.01)

(58) Field of Classification Search
USPC .......................................................... 705/44
See application file for complete search history.

(56) References Cited

U.S. PATENT DOCUMENTS

| | | | |
|---|---|---|---|
| 2007/0162756 A1* | 7/2007 | Fredlund | H04N 1/32122 713/176 |
| 2009/0173784 A1* | 7/2009 | Yang | G06Q 20/20 235/380 |
| 2012/0143760 A1* | 6/2012 | Abulafia | G06Q 20/40145 705/44 |
| 2012/0292388 A1* | 11/2012 | Hernandez | G06Q 20/3276 235/379 |
| 2013/0204786 A1 | 8/2013 | Mattes et al. | |
| 2014/0044303 A1* | 2/2014 | Chakraborti | G06T 7/0002 382/100 |
| 2014/0101047 A1* | 4/2014 | Gardiner | G06Q 20/389 705/44 |
| 2016/0071101 A1* | 3/2016 | Winarski | G06Q 20/3829 705/71 |
| 2016/0085958 A1* | 3/2016 | Kang | G06K 9/00067 726/19 |
| 2016/0217453 A1* | 7/2016 | Gardiner | G06Q 20/3227 |
| 2016/0294562 A1* | 10/2016 | Oberheide | G06F 21/40 |
| 2017/0178141 A1* | 6/2017 | Sancak | G06Q 20/341 |
| 2018/0197031 A1* | 7/2018 | Kurian | G08B 21/0297 |

\* cited by examiner

PAYMENT CARD TRANSACTION AUTHORIZATION SYSTEM AND PROCESS

CROSS REFERENCING TO RELATED APPLICATIONS

This application claims priority to Singapore Patent Application No. 10201707092S, filed Aug. 30, 2018, entitled "PAYMENT CARD TRANSACTION AUTHORIZATION SYSTEM AND PROCESS", the entirety of which is incorporated herein by reference.

TECHNICAL FIELD

The present invention relates to card-based payment systems for effecting card-based transactions, such as credit or debit card payment systems.

BACKGROUND

Card-based payment systems using physical payment cards such as credit cards and debit cards are ubiquitous in today's society, and are widely used for payment transactions at points-of-sale (POS) (e.g., brick and mortar stores) and on the Internet (so-called 'online' or 'electronic commerce' transactions). In an online setting, it is generally the case that a customer purchasing goods and/or services from a merchant over the Internet is required to manually enter their payment card details into interactive controls (typically a combination of textbox fields and pull-down menus) of a graphical user interface for each and every transaction, which is generally inconvenient and prone to error, particularly when using the relatively small (physical or otherwise) keyboard and display screen of a mobile device such as a smartphone or the like, particularly for customers who are elderly or have a visual and/or physical handicap. These difficulties are compounded for customers who have different payment cards for different payment accounts and/or different types of payments, whether these be credit cards, debit cards, stored value cards, loyalty cards, and the like.

In addition to this inconvenience for online transactions, and also in the case of POS transactions (where additionally a personal identification number or "PIN" must be typed by the customer), there is a general need for improved security when using card-based payments in order to reduce the likelihood of unauthorised payment transactions.

It is desired, therefore, to provide a system and process that alleviate one or more difficulties of the prior art, or to at least provide a useful alternative.

SUMMARY

In a first aspect, there is provided a payment card transaction authorisation system, including:
  at least one payment card authorisation database storing authorisation data representing authentication information associated with the payment cards of the customers;
  a payment card authorisation server coupled to the payment card authorisation database, and including:
    a network interface coupled to a communications network; at least one processor; and
    a memory coupled to the at least one processor to store executable instructions for execution by the at least one processor to cause the at least one processor to automatically:
      receive, via the network interface, authorisation request data representing a request to authorise a payment card transaction between a customer and a merchant, the authorisation request data including payment card image data representing an electronic image of a payment card of the customer and one or more authentication indications made with respect to the payment card by the customer at a time of the authorisation request;
      process the payment card image data to generate:
      (i) first authentication factor data representing payment card information of the customer's payment card; and
      (ii) second authentication factor data corresponding to the authentication indications made with respect to the payment card by the customer in the electronic image; and
      process the first authentication factor data and the second authentication factor data to determine whether to authorise the request;
    wherein the processing includes:
      based on the first authentication factor data generated from the image, accessing the payment card authorisation database to retrieve predetermined second authentication factor data associated with the payment card of the customer; and
      processing the second authentication factor data generated from the image and the retrieved predetermined second authentication factor data to determine whether to allow or deny authorisation of the request, wherein authorisation is allowed only if the one or more authentication indications made with respect to the payment card by the customer correspond to the predetermined second authentication factor data stored in the payment card authorisation database.

In a second aspect, there is provided a computer-implemented payment card authorisation process executed by at least one processor of a payment card transaction authorisation system, the process including the steps of:
  receiving, via the network interface, authorisation request data representing a request to authorise a payment card transaction between a customer and a merchant, the authorisation request data including payment card image data representing an electronic image of a payment card of the customer and one or more authentication indications made with respect to the payment card by the customer at a time of the authorisation request;
  processing the payment card image data to generate:
    (i) first authentication factor data representing payment card information of the customer's payment card; and
    (ii) second authentication factor data corresponding to the authentication indications made with respect to the payment card by the customer in the electronic image; and
  processing the first authentication factor data and the second authentication factor data to determine whether to authorise the request;
  wherein the processing includes:
    (i) based on the first authentication factor data generated from the image, accessing a payment card authorisation database to retrieve predetermined second authentication factor data associated with the payment card of the customer; and
    (ii) processing the second authentication factor data generated from the image and the retrieved predetermined second authentication factor data to determine whether to allow or deny authorisation of the request, wherein authorisation is allowed only if the one or more authentication indications made with respect to the payment card by the customer correspond to the predetermined second authentication factor data stored in the payment card authorisation database.

BRIEF DESCRIPTION OF THE DRAWINGS

Some embodiments of the present invention are hereinafter described, by way of example only, with reference to the accompanying drawings, in which like reference numbers refer to like components, and wherein.

DETAILED DESCRIPTION

As described below, embodiments of the present invention can both simplify the use of payment cards, and improve their security by using multi-factor authentication of the customer's identity when determining whether to authorise a payment card transaction. Embodiments of the present invention can simplify the use of payment cards by capturing or generating an electronic image of a customer's payment card at the time of requesting a payment card transaction, and processing the electronic image to automatically determine required payment card information, including the payment card number, account name, and expiry date printed or otherwise represented on the payment card. Moreover, embodiments of the present invention can also improve the security of payment card transactions by using the same electronic image to automatically perform multi-factor authentication of the customer's identity. As known by those skilled in the art, multi-factor authentication relies on the simultaneous use of at least two of the three forms or "factors" of authentication, namely: (i) possession (of an object that only the customer should have in their possession), (ii) knowledge (of something only the customer should know), and (iii) inherence (something that should be inherent only to the customer (e.g., biometric authentication)).

In the described embodiments, a first authentication factor is provided by possession of the customer's payment card, and a second authentication factor is provided by one or more indications made by the customer and visible in the electronic image, these being nominally known only to the customer and referred to hereinafter as 'authentication' indications. In the described embodiments, these authentication indications are made with respect to the payment card, but this need not be the case in other embodiments.

Figure 1:
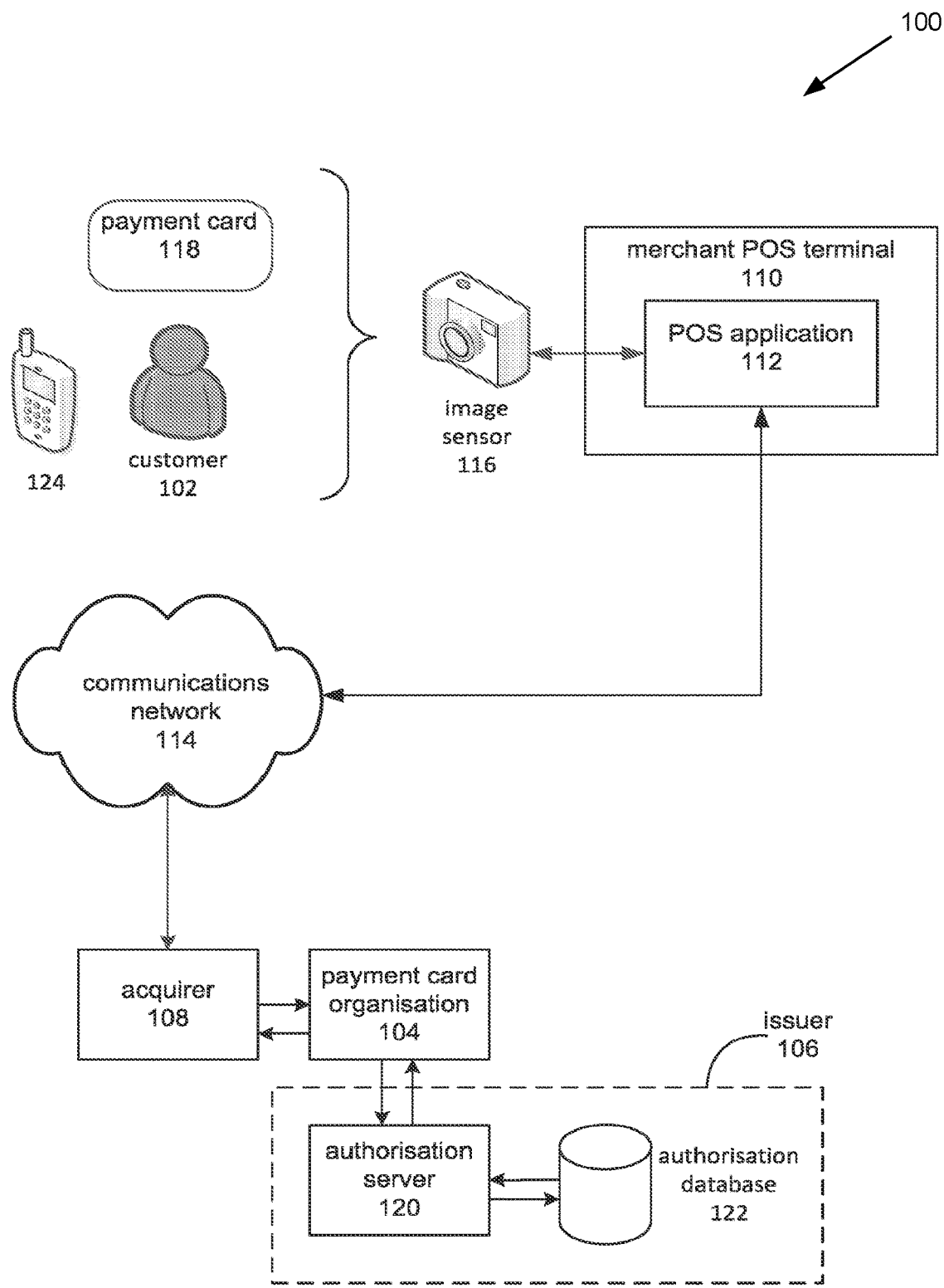
FIG. 1 is a block diagram showing components of a payment card transaction authorisation system in accordance with some embodiments of the present invention, in which a customer makes a payment card transaction with a merchant at the merchant's premises.
Figure 2:
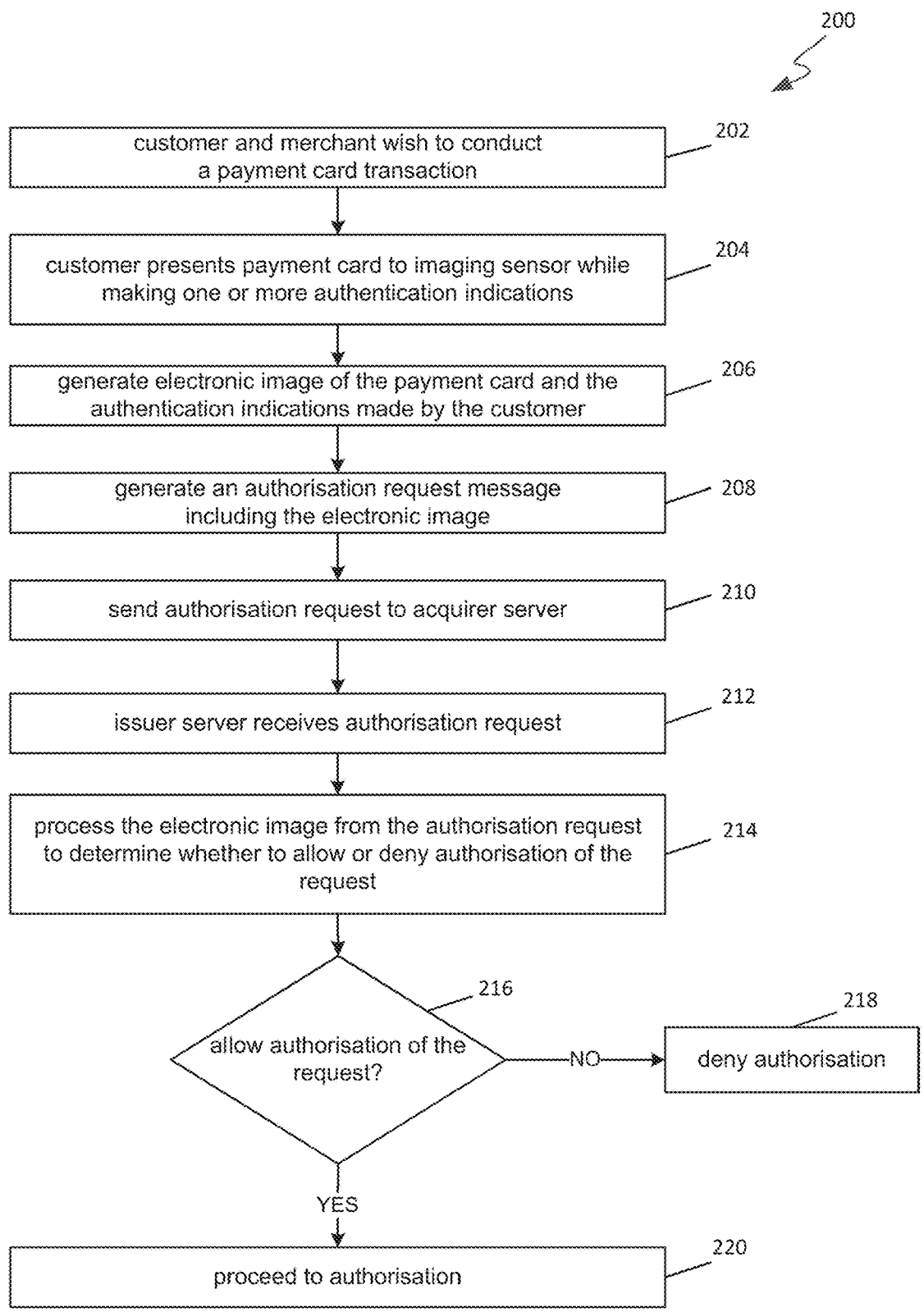
FIGS. 2 and 3 are flow diagrams of a card payment transaction authorisation process in accordance with some embodiments of the present invention, in which a customer makes a payment card transaction with a merchant at the merchant's premises.

Embodiments of the present invention will now be described in the context of a customer and a merchant wishing to make a transaction using a payment card of the customer. In some embodiments, as shown in FIGS. 1 and 2, a merchant provides goods and/or services to a customer 102 visiting a 'brick and mortar' premises (e.g., a store or restaurant) of the merchant, and the customer 102 wishes to effect a payment card transaction while at the merchant's premises.

Payment card systems generally include electronic data processing systems operated by or on behalf of at least three businesses or organisations to provide payment card services to customers and merchants. These three organisations include an organisation 104 (such as Mastercard®) referred to herein as the "payment card organisation" that operates a payment card system and network, and licenses use of its payment card system and network to the other organisations. Another of these organisations is referred to as "the issuer" 106 because it issues payment cards to its customers (under license from the payment card organisation). In the context of the described embodiments, the issuer 106 is the customer's bank. The third organisation 108, known in the art as "the acquirer", uses the payment card organisation's payment card system and network to receive payments from the issuer 106. In the context of the described embodiments, the acquirer 108 is the merchant's bank.

The merchant and the customer 102 both wish to effect a payment card transaction using the customer's payment card, and this is achieved using a point-of-sale (POS) terminal or device 110 of the merchant that executes instructions of a card payment application 112 that is stored within the POS terminal 110 as firmware.

By way of background, in prior art card payment systems, a merchant's (prior art) POS terminal electronically reads data representing the customer's payment card details from the customer's payment card, using either a contact (e.g., magnetic stripe reader) or contactless (e.g., near-field communications (NFC)) sensor of the prior art POS terminal. The data read from the card is then used to generate a transaction authorisation request that is sent to the merchant's bank (the acquirer) via a communications network 114, which may be a private network or a public network, and is typically a mobile telecommunications network.

In the described embodiments, the POS terminal 110 includes an image sensor 116 (either integrated within a housing of the POS terminal 110 or alternatively separate to but in communication with it via either wired (e.g., USB) or wireless (e.g., Wi-Fi or Bluetooth) communications). In the described embodiments, the image sensor 116 is a digital camera; however, whereas other embodiments, the image sensor 116 may be an image sensor chip (e.g., a packaged CMOS image sensor), and the POS terminal 110 includes associated optics, power supplies and signal interfaces known to those skilled in the art.

When seeking to effect a payment card transaction using the customer's payment card 118, the payment card system 100 executes steps of a payment card transaction authorisation process 200, as shown in FIG. 2. The process 200 begins when a customer and merchant wish to conduct a payment card transaction (step 202). In this example, the customer wishes to purchase goods and/or services from the merchant in exchange for a payment made by way of an electronic payment transaction made using the customer's payment card, although it will be apparent to those skilled in the art that other (non-payment) types of electronic transaction can be effected in the same general manner.

Rather than the customer 102 swiping or inserting their payment card 118 into the merchant's POS terminal 110, or the customer 102 or merchant having to manually enter the customer's payment card details into the merchant's POS terminal 110, at step 204 and in accordance with embodiments of the present invention, the customer 102 presents their payment card 118 to the image sensor 116 of the POS terminal 110 while making one or more authentication indications, as described below, in view of the image sensor 116.

The subsequent steps of the payment card transaction authorisation process 200 are executed by the payment card system 100. At step 206, the POS terminal 110, under control of the POS application 112, activates the image sensor 116 in order to generate an electronic image that shows not only the customer's payment card 118, but also the authentication indications made by the customer 102.

At step 208, the POS terminal 110 generates an authorisation request message that includes image data representing the electronic image, and at step 210, it sends the authorisation request message to a transaction server (not shown) of the acquirer 108 via the communications network 114. The electronic image is not stored on the merchant's POS terminal 110, and the authorisation request message is encrypted prior to sending, using standard encrypted messaging methods known to those skilled in the art.

Using a general arrangement familiar to those skilled in the art, the acquirer's server sends the authorisation request message (or at least a corresponding authorisation request message) to a server of the corresponding payment card organisation (e.g., MasterCard) 104, which in turn forwards the authorisation request message (or at least sends a corresponding authorisation request message) to an authorisation server 120 of the issuer 106.

At step 212, the authorisation server 120 of the issuer 106 receives an authorisation request message including or representing the authorisation request, and including image data representing the electronic image of the customer's payment card 118 and the authentication indications made by the customer 102 at the time of making the authorisation request.

At step 214, the authorisation server 120 then executes an authentication process 300 (described below) that processes the image data representing the electronic image to determine whether or not to allow authorisation of the authorisation request. If, at step 216, the result of this processing is determined to be that authorisation is to be denied, then authorisation is denied at step 218, by sending one or more corresponding messages back to the merchant's POS terminal 110 via the servers 104, 108 of the payment card organisation and the acquirer. Alternatively, if the processing at step 214 determines that authorisation should be allowed, then the process proceeds to step 220 in which, typically, one or more standard authorisation steps involving the determination of whether the customer's account has sufficient funds to support the requested payment to the merchant is used to determine whether to effect or deny the requested payment transaction from the customer's account to an account of the merchant.

Figure 3:
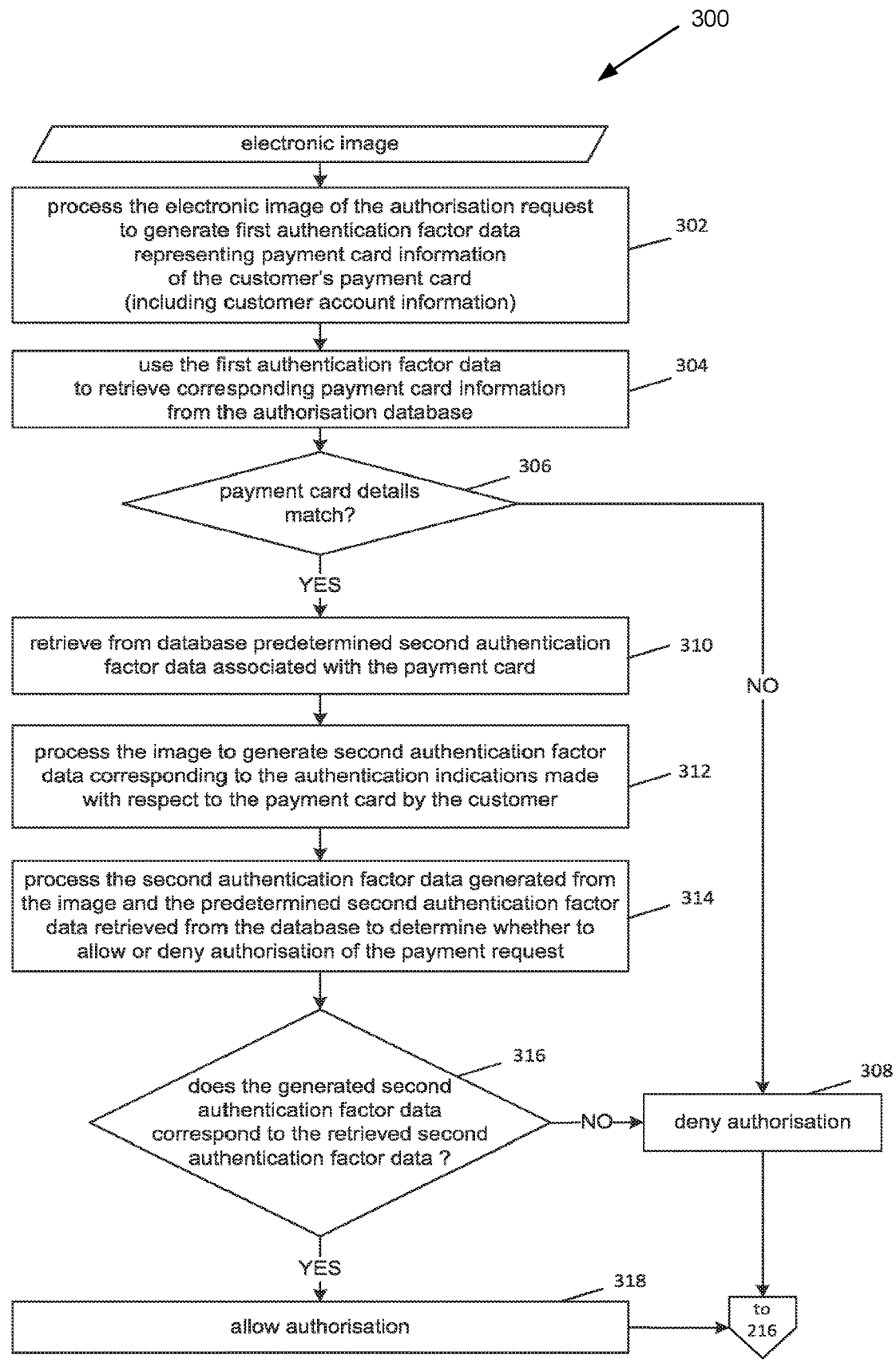

The authentication process 300, as shown in FIG. 3, processes the electronic image at step 302 to generate first authentication factor data representing payment card information of the customer's payment card 118, including the card number, expiration date, and customer name that are either printed on the customer's payment card, or otherwise represented on or in the card (e.g., by embossing). This payment card information can be determined at step 304 by applying standard image processing methods known to those skilled in the art (including optical character recognition (OCR)) to the electronic image in order to automatically determine payment card information such as the customer's name as it appears on the card, the card number, and its expiry date, thereby avoiding the need for the customer to manually enter that information. Additionally, information visible only on the rear of the customer's payment card (in particular, the card verification value ("CVV") number, which some payment card organisations provide only on the rear side of their payment cards) can be determined in this manner by imaging the rear side of the customer's payment card and processing this image using a method such as that described in United States Patent Application Publication No. 2009/0173784 to determine not only the information visible on the rear of the payment card, but also the payment card number, account name, and expiry date information embossed into the card and thus requiring image reversal or mirroring when viewed from the rear side of the card.

In some embodiments, one or more other physical characteristics of the customer's payment card 118 are also determined from the electronic image of the payment card 118. For example, in some embodiments, one or more of colour, pattern, and shape of the customer's payment card 118 are also determined from the image, and compared with the corresponding known characteristics of the card to determine whether the visual characteristics of the customer's card determined at the time of requesting the transaction match those stored in association with the customer's account with the card issuer.

Other suitable characteristics of the card, for example, using wavelengths outside the visible spectrum, will be apparent to those skilled in the art in light of this disclosure.

At step 306, the payment card information determined from the electronic image are used to retrieve corresponding information from an authorisation database 122 (issuer authorisation database) of or in communication with the authorisation server 120, and at least the payment card number, name, and expiry date determined from the electronic image of the customers payment card 118 are compared with the corresponding information retrieved from the authorisation database 122. If the two sets of information do not match, then authorisation is denied at step 308, and the process 300 ends by returning to step 216 of process 200.

Otherwise, if the card details match, then at step 310, the customer's payment card information (or at least a database key corresponding to that information) is used to retrieve (from the authorisation database 122) predetermined second authentication factor data associated with the customer's payment card. This retrieved data represents, or at least corresponds to, one or more authentication indications that are to be made by the customer 102 at the time of requesting authorisation for a payment card transaction in order to authenticate the customer 102 to the issuer 106. Accordingly, these authentication indications are nominally known only to the customer 102 and the issuer 106, are nominally unique to the pairing of the customer 102 and the customer's payment card 118, and have been selected by the issuer 106 or the customer 102.

Typically, these multiple authentication indications are made by the customer 102 with respect to the payment card 118 itself. For example, in some embodiments, these authentication indications can include characteristics of the manner in which the customer is holding the payment card; for example, one or more characteristics selected from:

the orientation of the payment card 118 in the electronic image;

which edges or corners of the payment card 118 are being used to hold the card;

the number of fingers touching one or more specified edges of the payment card 118 and/or locations within the boundary of the payment card 118;

the number of the customer's fingers in the electronic image; the customer indicating one or more locations within the boundary of the payment card 118;

the customer indicating one or more symbols within the boundary of the payment card 118.

Regarding item (i) above, authentication of the customer's identity could be inferred by requiring the customer to arrange the payment card 118 at a specific known orientation when the electronic image is generated. For example, the payment card 118 might be required to be oriented upside-down, or alternatively oriented or rotated at an angle of approximately 90° or 45° to the horizontal or vertical directions. The direction of this rotation (e.g., clockwise or counterclockwise) may also be specified if so desired.

Figure 9:
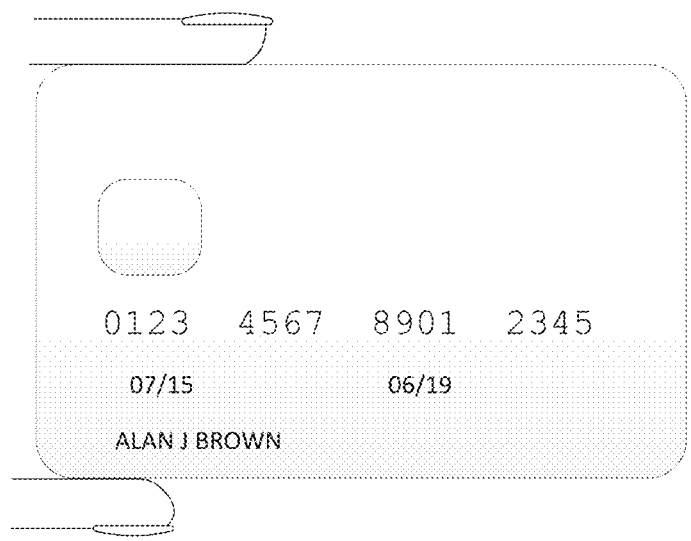

Regarding item (ii) above, the authentication indications can be, for example, that the customer is holding the payment card 118 by its top and bottom edges (or is at least touching the payment card 118 by those edges), as shown in FIG. 9, or alternatively by its side edges, or by one side edge and one of the top and bottom edges, or by any two opposite corners, or by a specified number of corners, or by one or more specific corners of the payment card 118. These indications can be exclusive: that is, the customer is required to hold the payment card 118 only by those edges (or touch only those edges), or inclusive, whereby the customer 102 can also be touching other edges or parts of the payment card 118, providing that the specific required edge or edges are being touched or used to hold the payment card 118.

Figure 6:
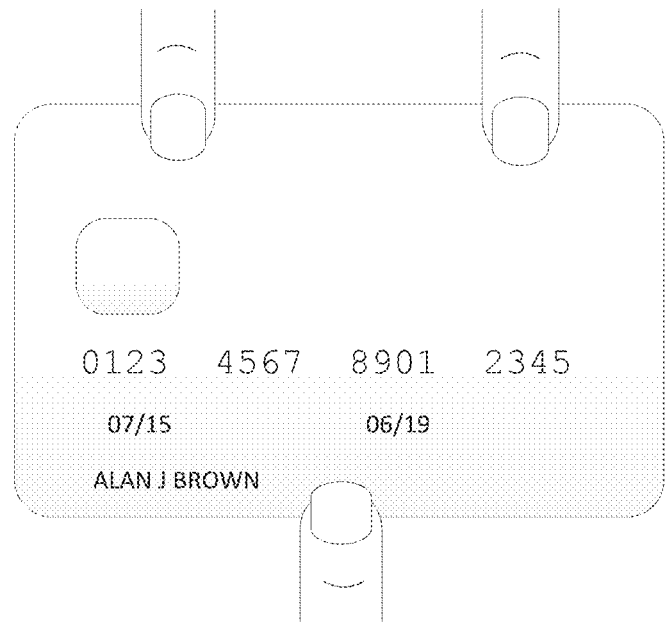
FIGS. 6 to 11 are illustrations of various authentication indications that can be made by a customer in an electronic image in accordance with embodiments of the present invention.

Regarding item (iii) above, the authentication indications can require that the customer 102 hold (or touch) the payment card 118 by a specified number of fingers. For example, the customer 102 might have two hold the payment card 118 by three fingers, as shown in FIG. 6. The authentication indications may require that the fingers be at specified edges of the card (for example, one finger on the bottom edge of the payment card 118 and two fingers on its top edge, as shown in FIG. 6), or at any edges of the payment card 118.

Regarding item (iv) above, the authentication indications can require that the customer 102 include a specified number of fingers in the electronic image, whether holding the payment card 118 or otherwise.

Figure 7:
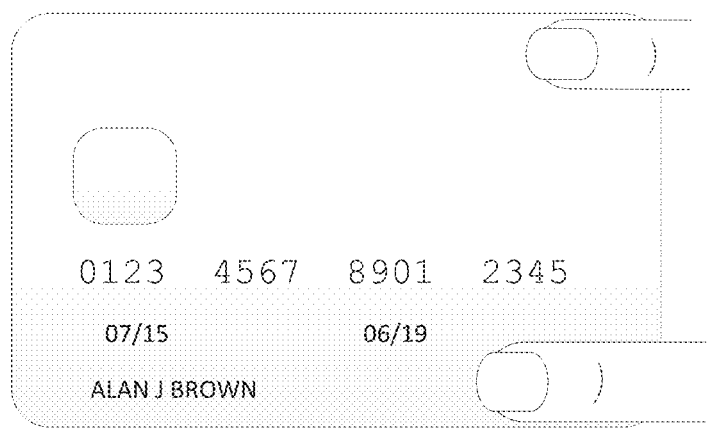
Figure 8:
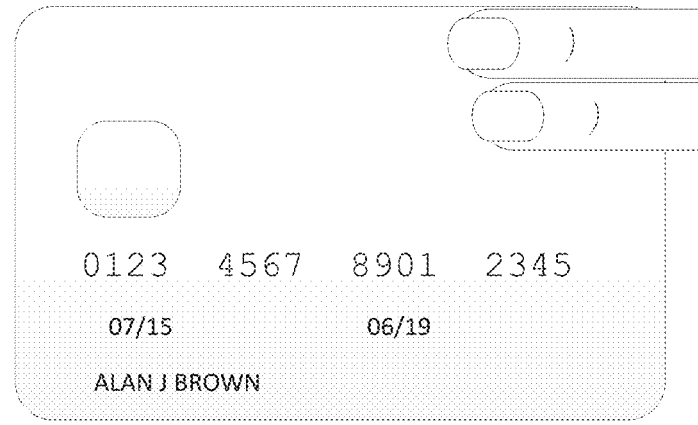

Regarding item (v) above, the authentication indications can require that the electronic image show the customer indicating one or more locations within the boundary of the payment card 118. In the described embodiments, these locations are specific locations within the boundary of the card; however, in other embodiments it may be sufficient to simply indicate a particular number (for example, three) arbitrary locations, provided that the customer 102 does not obscure the imaging sensor 116's view of the payment card information as it appears on the customers payment card 118. For example, the authentication indications may require that the customer 102 places a finger or thumb over the chip contacts of the payment card 118. They may also require that this finger or thumb approach from only the side (or alternatively the top) of the payment card 118, as generally shown in FIG. 7. They may also require that another of the customer's fingers (or thumb) obscures another location of the card (for example, the top right corner of the card, as shown in FIG. 8). Many variations will be apparent to those skilled in the art in light of this disclosure.

Figure 10:
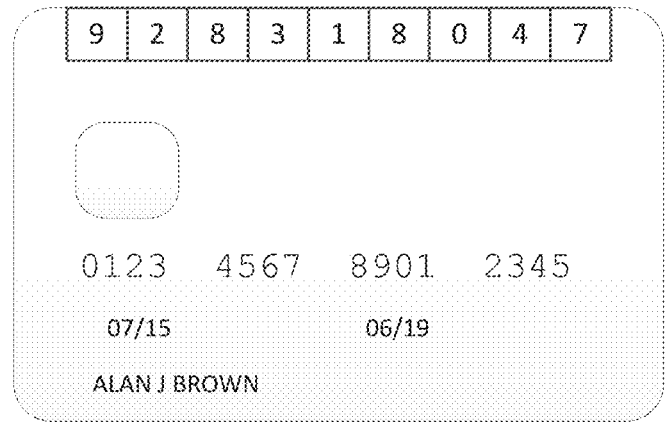
Figure 11:
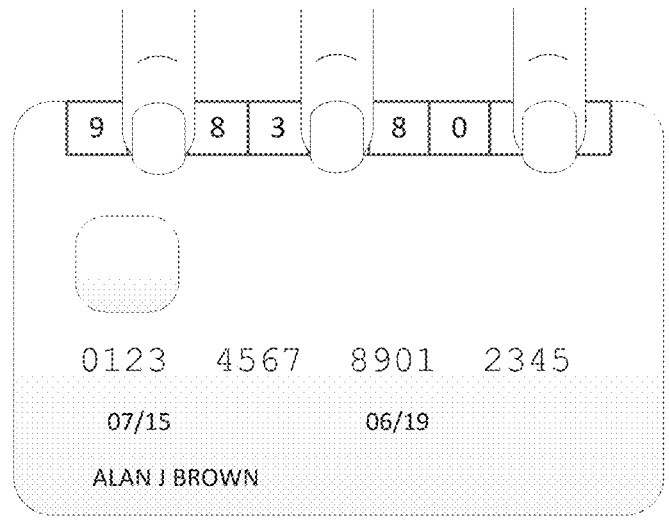

Regarding item (vi) above, the authentication indications can require that the customer 102 indicates a secret code nominally known only to the customer (and effectively the issuer 106) by pointing to one or more corresponding symbols on the customer's payment card 118. In one embodiment, the symbols are printed (or embossed or otherwise made visible) on one face of the customer's payment card 118 at locations just within one of its edges, as shown in FIG. 10. The symbols may be any type of symbol, but in one embodiment are numeric digits, and in one embodiment The customer 102 is required to indicate their PIN by indicating corresponding digits. In this embodiment, each payment card 118 issued by the issuer 106 has a unique (or at least nominally unique) combination of digits on the card, including digits selected and ordered to enable their indication by the customer 102 placing their fingers at corresponding locations when the digital image is acquired. For example, if a customer's payment card PIN is "2147", then that customer's payment card may be provided with a corresponding sequence of digits along the top edge of the card; for example, the apparently random sequence 9, 2, 8, 3, 1, 8, 0, 4, 7, as shown in FIG. 10. In order to verify the customer's identity, the customer 102 places their fingers at locations along the top edge of the card that indicate the digits of the sequence corresponding to their PIN; for example, the customer can use three of their fingers to cover or effectively point to the digits 2, 1, 4, 7, as shown in FIG. 11, thereby confirming their PIN. By having the customers fingers obscure the digits of the PIN, this enhances security by preventing an observer (whether the merchant or otherwise) from observing the PIN digits. In some embodiments, the PIN or other secret code determined by the placement of the customers fingers is not fixed but varies for different transactions. For example, a customer could use multiple PINs in rotation, or different PINs depending on whether the date is order even, the day of the week, et cetera. Many other methods for selecting different PINs for payment card transactions will be apparent to those skilled in the art in light of this disclosure.

It will be apparent that combinations of the authentication indications (i) to (vi) described above (and indeed other such indications) can be used to increase the complexity of the authentication if desired. It will be apparent that there are an enormous variety of different arrangements and combinations that can be used as authentication indications, of which those illustrated in FIGS. 6 to 11 are only a tiny selection.

Having retrieved from the authorisation database 122 the predetermined second authentication factor data associated with the customer's payment card 118, at step 312 the electronic image is processed as described below to generate image second authentication factor data corresponding to the authentication indications made by the customer 102 and apparent from the electronic image.

At step 314, the predetermined second authentication factor data and the generated image second authentication factor data are processed to determine whether the authentication indications made by the customer at the time of the transaction authorisation request correspond to those represented in the authorisation database 122 of the issuer 106 (i.e., to determine whether they are those previously selected for authentication purposes by the customer 102 or the issuer 106 (typically, but not necessarily), at the time the customer's payment card 118 was activated by the issuer 106).

If that is not the case, then at step 316 the process branches to deny authorisation at step 308, and control is returned to step 216 of the process 200 shown in FIG. 2. Otherwise, the process branches to allow authorisation at step 318. In practice, this means that the customer's identity has been authenticated, and standard transaction authorisation steps can now be performed in order to confirm that, in the case of a payment transaction for example, that the customer's account with the issuer 106 has sufficient funds for the requested payment to the merchant.

As described above, in some embodiments, one or more other visual characteristics of the customer's payment card 118 such as colour, pattern, and/or shape of one or more regions of the customer's payment card 118 can additionally be determined from the electronic image of the payment card 118 and used as a further assessment of whether the payment card in the electronic image is the customer's genuine card, and not another card or forgery (for example, where details of the customer's payment card 118 have been compromised, but not the physical card itself).

The image processing performed at step 312 is based on standard image processing methods known to those skilled in the art. For example, artificial neural networks are used to carry out the image processing. Alternatively, image classification algorithms can be used by assessing, for instance, pixel brightness at each point, red/green/blue pixel density at each point, text and numbers present on the card, image size/shape and so forth in order to carry out the image processing.

The retrieval of the customer's predetermined second authentication factor data from the authorisation database 122 before determining whether the electronic image provides corresponding authentication indications can facilitate the latter determination, depending on the form of the predetermined second authentication factor data. For example, in embodiments where the predetermined second authentication factor data can be used to determine what those authentication indications are, then this can simplify the image processing in view of the prior knowledge of the authentication indications being sought in the electronic image. However, in some embodiments the predetermined second authentication factor data may be stored in a more secure form (e.g., after applying a one-way hashing algorithm) that does not allow direct termination of the authentication indications, in which case the process needs to determine whether the stored and dynamically generated second authentication factor data 'correspond' to one another.

In some embodiments, a further level of authentication is performed by confirming that a smartphone 124 of the customer 120 is in, or at least is in the vicinity of, the merchant's premises, as shown in FIG. 1. This is achieved by an 'app' (i.e., software application) installed in the smart phone 124 transmitting the smart phone's GPS coordinates to the authorisation server 120 via the communications network 114. The app does this in response to a request issued by an out of band request issued by the authorisation server 120 after it receives the transaction approval request. In this regard, an additional layer of security is provided.

Figure 4:
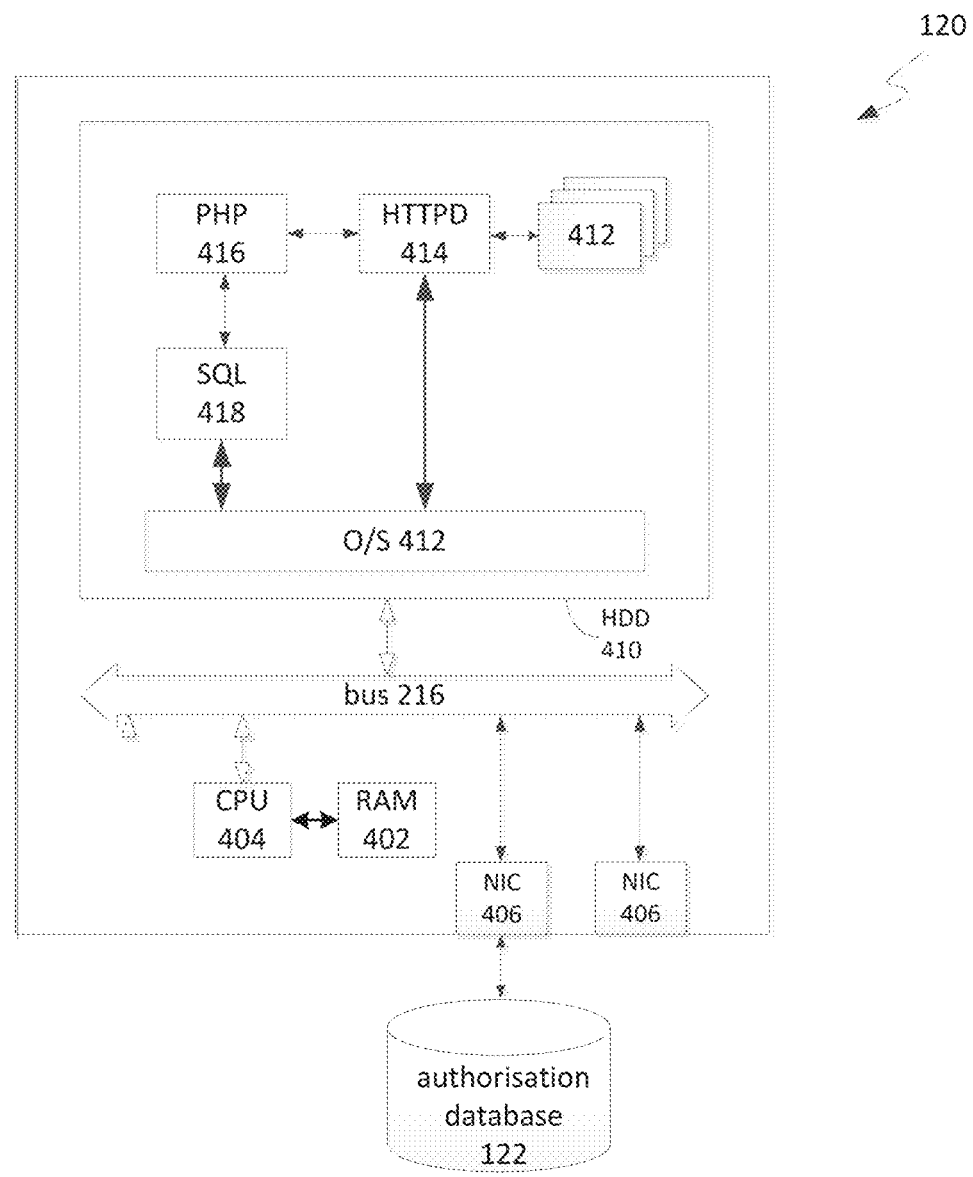
FIG. 4 is a block diagram showing components of an authorisation server of the payment card transaction system in accordance with some embodiments of the present invention.

In the described embodiments, the authorisation server 120 is an Intel Architecture computer system, as shown in FIG. 4, including random access memory (RAM) 402, at least one processor 404, and at least one network interface connector (NIC) 406 that connects the authorisation server 120 to at least one server (not shown) of the payment card organisation 104 via the latter's private network. In the described embodiments, the authorisation server 120 communicates with the authorisation database 122 via the NIC 406; however, in other embodiments these entities 120, 122 may communicate with one another via another type of high-speed data communication interface, such as a SATA, USB3, or Thunderbolt interface, for example.

In the described embodiments, the steps of the payment card transaction authorisation process 200 executed by the authorisation server 120 are implemented by executable instructions stored on non-volatile (e.g., hard disk or solid-state drive) storage 410 of or associated with the authorisation server 120. However, it will be apparent that some or all of these steps could alternatively be implemented as configuration data of one or more field programmable gate arrays (FPGAs), or as one or more dedicated hardware components, such as application-specific integrated circuits (ASICs), for example.

The authorisation server 120 also includes a number of other software modules 326 to 330, including an operating system 412 such as Linux or Microsoft Windows, and web server software 414 such as Apache, available at http://www.apache.org, scripting language support 416 such as PHP, available at http://www.php.net, or Microsoft ASP, and structured query language (SQL) support 418 such as MySQL, available from http://www.mysql.com, which allows data to be stored in and retrieved from the authorisation database 122.

Figure 5:
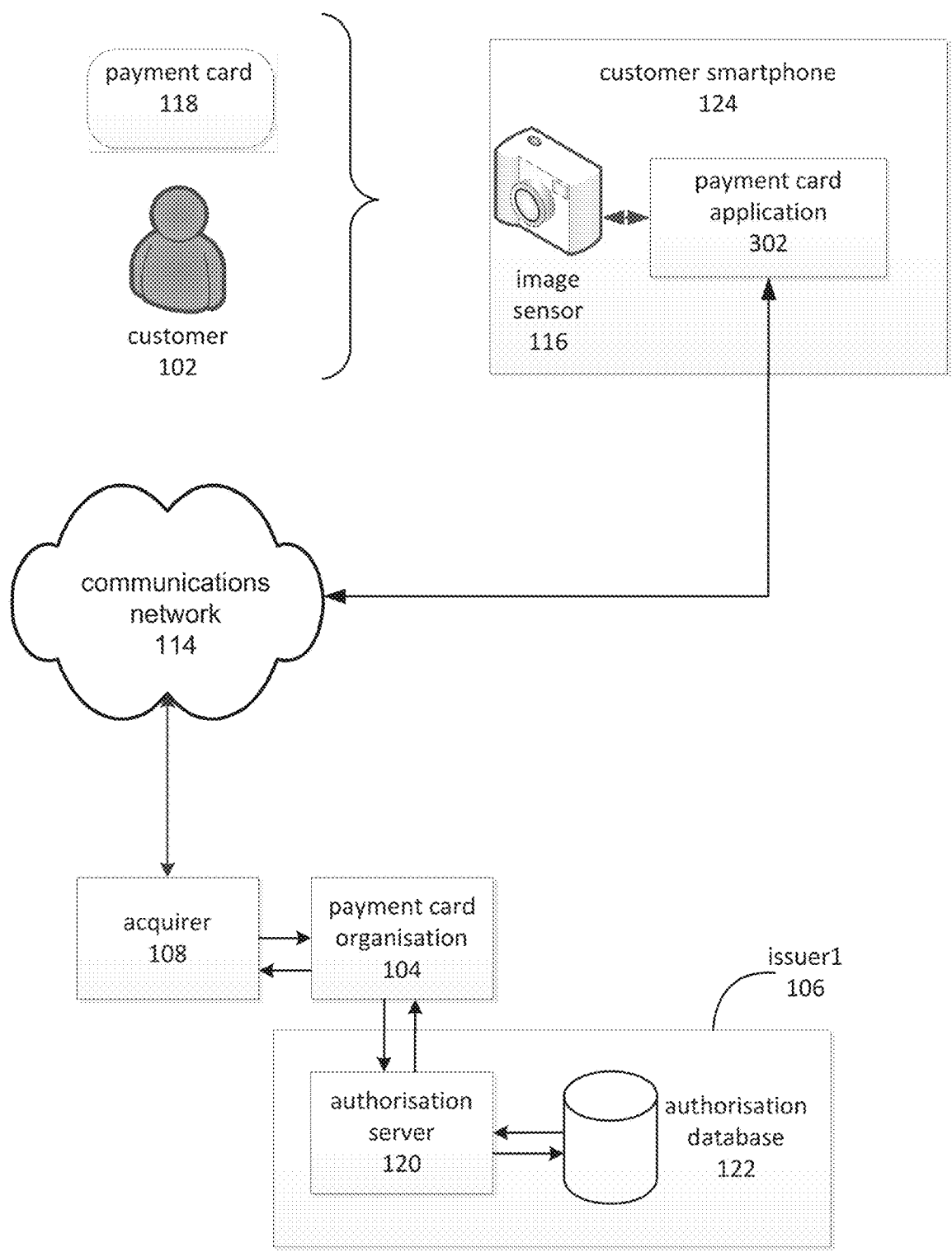
FIG. 5 is a block diagram showing components of a payment card transaction system in accordance with some embodiments of the present invention, in which a customer makes a payment card transaction over a communications network such as the Internet.

In an alternative embodiment, as shown in FIG. 5, a payment card application 302 is installed on the customer's smartphone 124, which includes the image sensor 116 in the form of the smartphone's built-in camera. In this embodiment, the customer 102 can effect payment card transactions at any location (including at the customer's home) without needing to attend a merchant's premises. In this embodiment, the payment card application 302 effectively plays a role that is nearly the same as that played by the merchant's POS terminal 110 in the embodiments described above. That is, the customer's own smart phone 124 generates the electronic image of the customer's payment card 118 and the authentication indications made by the customer. Other details of the transaction may be provided to the payment card application 302, either by the customer entering them using the smartphone screen or a keyboard connected to the smart phone 124, or communicated to the payment card application 302 by another application executing on the smart phone 124.

Alternatively, a payment card transaction initiated over the Internet 114 (using either a different application (e.g., a web browser application) executing on the customer's smart phone 124 or an independent computer (e.g., a personal computer of the customer 102) can cause a transaction authentication message (e.g., an SMS message) to be sent to the customer's smart phone 124 (a general method that is already in common use). The message contains a hyperlink that, when selected, causes the payment card application 302 to be executed, while simultaneously providing a transaction identifier to the payment card application 302. The payment card application 302 then displays a message to the customer 102 and activates the image sensor 116 of the smart phone 124. The displayed message instructs the customer 102 to take a photograph of their payment card 118, in the manner generally described herein.

Once the corresponding electronic image of the customer's payment card 118 and the authentication indications made by the customer 102 match, the payment card application 302 causes the smartphone 124 to generate a transaction authorisation request and send it to a transaction server of the appropriate acquirer 108 (typically, that being a bank of the other party to the transaction) to be processed as described above in relation to the embodiment involving a merchant's POS terminal 110.

It will be apparent that embodiments of the present invention address difficulties of the prior art by enabling the use of a single electronic image taken at the time of requesting authorisation for a payment card transaction to provide what is known in the art as "two factor authentication" of the customer/user's identity (using possession and knowledge of the customer/user), while also automatically providing details of the customer/user's payment card. These features provide an additional degree of security for payment card transactions, while also avoiding the need for customers to manually enter their own credit card information (e.g., for online transactions). The customer/user's identity is authenticated by determining that, at the time of requesting a payment card transaction, they are in possession of the payment card (by providing payment card information, including CVV, and optionally also confirming that the visual appearance of the payment card in the electronic image matches that stored in a database), and also that they correctly provide authentication indications that are nominally known only to the customer (and, effectively, the issuer 106).

Many modifications will be apparent to those skilled in the art without departing from the scope of the present invention.

The invention claimed is:

1. A payment card transaction authorisation system, including:
    at least one payment card authorisation database storing authorisation data representing authentication information associated with the payment cards of the customers;
    a payment card authorisation server coupled to the payment card authorisation database, and including:
    a network interface coupled to a communications network;
    at least one processor; and
    a memory coupled to the at least one processor to store executable instructions for execution by the at least one processor to cause the at least one processor to automatically:
        receive, via the network interface, authorisation request data representing a request to authorise a payment card transaction between a customer and a merchant, the authorisation request data including payment card image data representing an electronic image of a payment card of the customer and one or more authentication indications made with respect to the payment card by the customer at a time of the authorisation request, wherein the one or more authentication indications include a number of fingers of the customer in the electronic image touching one or more edges of the payment card;
        process the payment card image data to generate:
        (i) first authentication factor data representing payment card information of the customer's payment card; and,
        (ii) second authentication factor data corresponding to the one or more authentication indications, the second authentication factor data further including a personal identification number (PIN); and
        process the first authentication factor data and the second authentication factor data to determine whether to authorise the request;
        wherein the processing includes:
            based on the first authentication factor data, accessing the payment card authorisation database to retrieve predetermined second authentication factor data associated with the payment card of the customer; and
            processing the second authentication factor data and the retrieved predetermined second authentication factor data to determine whether to allow or deny authorisation of the request, wherein authorisation is allowed if a comparison of the one or more authentication indications and the PIN with the retrieved predetermined second authentication factor data indicates that the one or more authentication indications and the PIN correspond to the retrieved predetermined second authentication factor data.

2. The payment card transaction authorisation system of claim 1, wherein the processing of the payment card image data includes determining one or more locations of the payment card indicated by the customer in the electronic image.

3. The payment card transaction authorisation system of claim 2, wherein the locations of the payment card are a subset of a plurality of locations of the payment card providing respective visual indicia.

4. The payment card transaction authorisation system of claim 3, wherein the visual indicia are numeric digits, and the digits indicated by the customer provide the PIN or other security code of the customer.

5. The payment card transaction authorisation system of claim 1, wherein the second authentication factor data includes one or more symbols within a boundary of the payment card, and wherein processing the second authentication factor data comprises determining whether the one or more symbols correspond to one or more symbols included in the retrieved second authentication factor data.

6. The payment card transaction authorisation system of claim 1, wherein the processing of the payment card image data includes determining a number of fingers or thumbs of the customer in the electronic image.

7. The payment card transaction authorisation system of claim 6, wherein the determination includes determining numbers of fingers or thumbs of the customer on edges of the payment card in the electronic image.

8. The payment card transaction authorisation system of claim 6, wherein the determination includes determining which edges of the payment card are being touched by fingers or thumbs of the customer in the electronic image.

9. The payment card transaction authorisation system of claim 1, wherein the second authentication factor data includes one or more of a color, a pattern, and a shape of the payment card.

10. A computer-implemented payment card authorisation process executed by at least one processor of a payment card transaction authorisation system, the process including operations of:
    receiving, via a network interface, authorisation request data representing a request to authorise a payment card transaction between a customer and a merchant, the authorisation request data including payment card image data representing an electronic image of a payment card of the customer and one or more authentication indications made with respect to the payment card by the customer at a time of the authorisation request, wherein the one or more authentication indications include a number of fingers of the customer in the electronic image touching one or more edges of the payment card;
    processing the payment card image data to generate:
    (i) first authentication factor data representing payment card information of the customer's payment card; and
    (ii) second authentication factor data corresponding to the one or more authentication indications, the second authentication factor data further including a personal identification number (PIN); and
    processing the first authentication factor data and the second authentication factor data to determine whether to authorise the request;

wherein the processing includes:
(i) based on the first authentication factor data, accessing a payment card authorisation database to retrieve predetermined second authentication factor data associated with the payment card of the customer; and
(ii) processing the second authentication factor data and the retrieved predetermined second authentication factor data to determine whether to allow or deny authorisation of the request, wherein the authorisation is allowed only if a comparison of the one or more authentication indications and the PIN with the retrieved predetermined second authentication factor data indicates that the one or more authentication indications and the PIN correspond to the retrieved predetermined second authentication factor data.

11. The computer-implemented payment card authorisation process of claim 10, wherein the second authentication factor data includes one or more symbols within a boundary of the payment card, and wherein processing the second authentication factor data comprises determining whether the one or more symbols correspond to one or more symbols included in the retrieved second authentication factor data.

12. The computer-implemented payment card authorisation process of claim 10, wherein the processing of the payment card image data includes determining one or more locations of the payment card indicated by the customer in the electronic image.

13. The computer-implemented payment card authorisation process of claim 12, wherein the locations of the payment card are a subset of a plurality of locations of the payment card providing respective visual indicia.

14. The computer-implemented payment card authorisation process of claim 13, wherein the visual indicia are numeric digits, and the digits indicated by the customer provide the PIN or other security code of the customer.

15. A non-transitory computer-readable storage medium having stored therein executable instructions which, when executed by at least one processor of a data processing system, cause the at least one processor to:
receive, via a network interface, authorisation request data representing a request to authorise a payment card transaction between a customer and a merchant, the authorisation request data including payment card image data representing an electronic image of a payment card of the customer and one or more authentication indications made with respect to the payment card by the customer at a time of the authorisation request, wherein the one or more authentication indications include a number of fingers of the customer in the electronic image touching one or more edges of the payment card;
process the payment card image data to generate:
(i) first authentication factor data representing payment card information of the customer's payment card; and
(ii) second authentication factor data corresponding to the one or more authentication indications, the second authentication factor data further including a personal identification number (PIN);
and process the first authentication factor data and the second authentication factor data to determine whether to authorise the request;
wherein the processing includes:
(i) based on the first authentication factor data, accessing a payment card authorisation database to retrieve predetermined second authentication factor data associated with the payment card of the customer; and
(ii) processing the second authentication factor data and the retrieved predetermined second authentication factor data to determine whether to allow or deny authorisation of the request, wherein the authorisation is allowed if a comparison of the one or more authentication indications and the PIN with the retrieved predetermined second authentication factor data indicates that the one or more authentication indications and the PIN correspond to the retrieved predetermined second authentication factor data.

16. The non-transitory computer-readable storage medium of claim 15, wherein the second authentication factor data includes one or more symbols within a boundary of the payment card, and wherein processing the second authentication factor data comprises determining whether the one or more symbols correspond to one or more symbols included in the retrieved second authentication factor data.

17. The non-transitory computer-readable storage medium of claim 15, wherein the processing of the payment card image data includes determining one or more locations of the payment card indicated by the customer in the electronic image.

18. The non-transitory computer-readable storage medium of claim 17, wherein the locations of the payment card are a subset of a plurality of locations of the payment card providing respective visual indicia.

19. The non-transitory computer-readable storage medium of claim 18, wherein the visual indicia are numeric digits, and the digits indicated by the customer provide the PIN or other security code of the customer.

20. The non-transitory computer-readable storage medium of claim 15, wherein the processing of the payment card image data includes determining a number of fingers or thumbs of the customer in the electronic image.

* * * * *